July 18, 1933. L. ROSENWALD 1,918,785
FLOWER HOLDER
Filed Sept. 12, 1929 2 Sheets-Sheet 1

INVENTOR
Lucian Rosenwald
BY
ATTORNEY

July 18, 1933.  L. ROSENWALD  1,918,785
FLOWER HOLDER
Filed Sept. 12, 1929  2 Sheets-Sheet 2
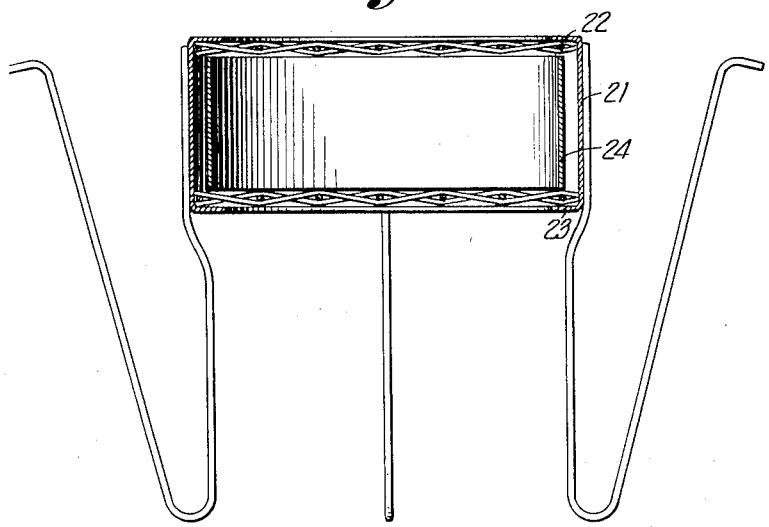
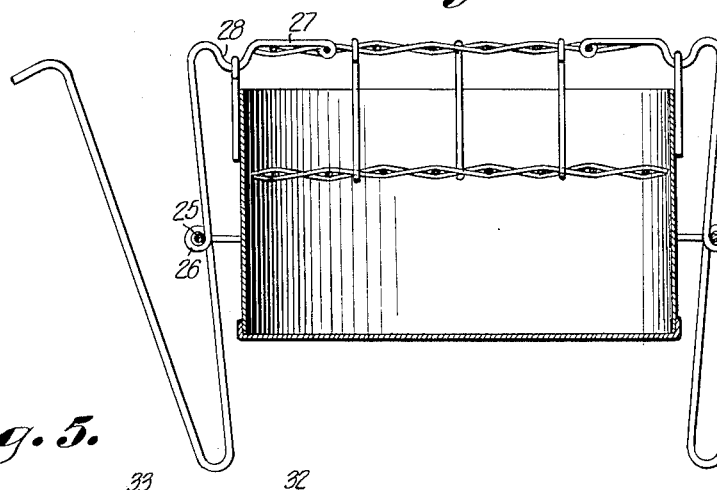
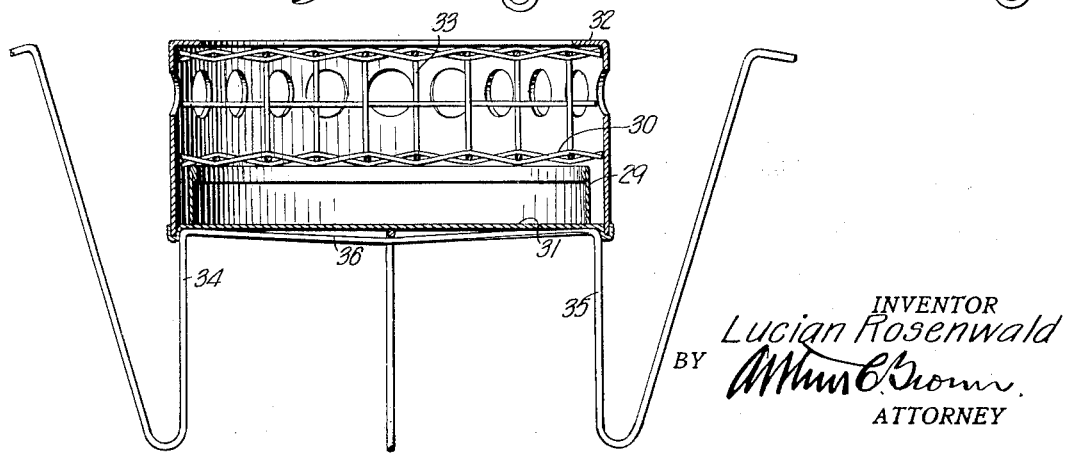
INVENTOR
Lucian Rosenwald
BY
ATTORNEY Patented July 18, 1933

1,918,785

UNITED STATES PATENT OFFICE

LUCIAN ROSENWALD, OF KANSAS CITY, MISSOURI, ASSIGNOR TO EMMA ROSENWALD, OF KANSAS CITY, MISSOURI

FLOWER HOLDER

Application filed September 12, 1929. Serial No. 392,032.

My invention relates to flower holders, and more particularly to foraminate supports adapted to be mounted in vases to receive the stems of flowers for preparing a flower arrangement, the principal objects of my invention being to improve the utility of flower holders, and to adapt flower holders for a greater variety of uses, whereby the number of kinds of flower arrangements may be increased, the labor of arranging flowers may be materially reduced, and flowers of various character and stem lengths may be retained in good condition in fixed positions in an arrangement.

Flowers arranged either in vases or baskets must be supplied with moisture. A present custom is to install a tin vase, container, liner or pan in a basket to contain water and receive the flowers, the stems being cut to lengths suitable for the desired arrangement. Further objects of my invention therefore, are to adapt flower holders for support either by a tin vase or a basket, to support flowers having stems of varying lengths in contact with moisture in a flower arrangement, to afford a definite setting in fixed position for each flower, and to effect a wide spread of flowers.

In accomplishing these and other objects of the invention, I have provided improved details of structure, the preferred forms of which are illustrated in the accompanying drawings, wherein:

Fig. 3 is a central vertical section of a modified form of holder, in which spaced screens are located in an annular housing-like side wall member.

Fig. 4 is a central vertical section of a flower support illustrating a cup suspended from the legs of the holder, and a reinforcing ring.

Fig. 5 is a central vertical section of a modified form of support illustrating a cup mounted on a wire frame and containing the screens.

Figure 1:
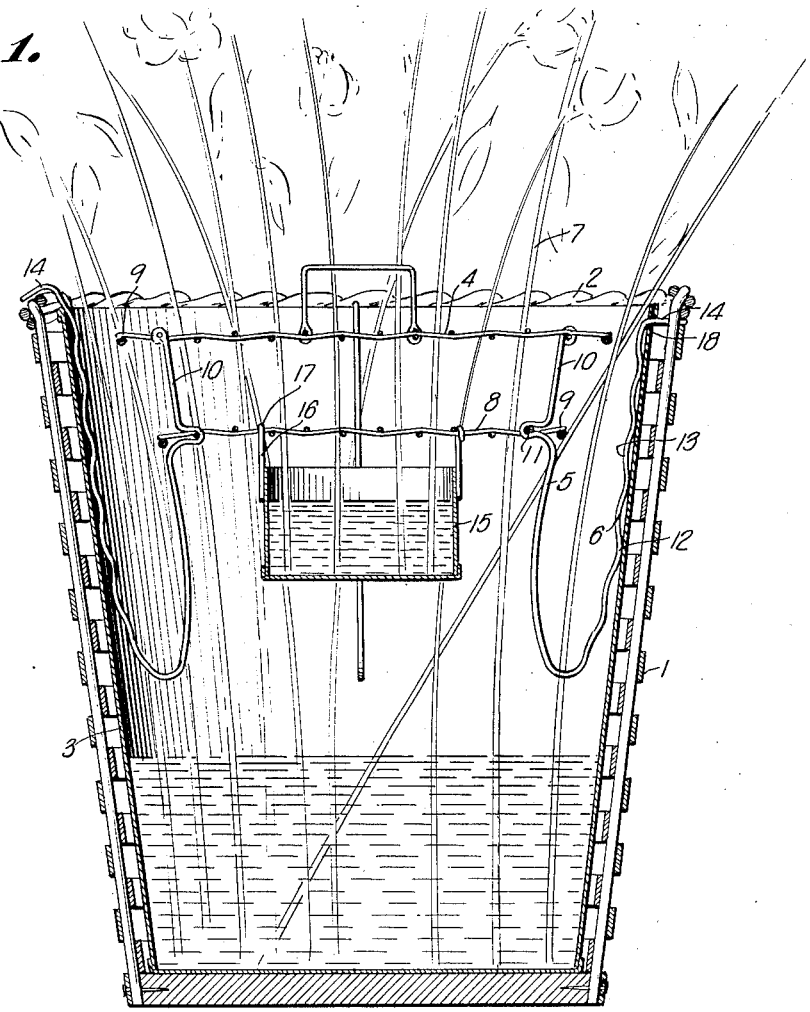
Fig. 1 is a central vertical section of a flower basket and liner provided with a flower holder embodying my invention, and illustrating part of a flower arrangement made feasible by the invention.

Referring in detail to the drawings:

1 designates a woven basket formed of strands or stems of vegetable material such as reed, rattan and willow and including a top or rim portion 2.

Mounted in the basket is a vase or liner 3 comprising a can to contain water and receive the stems of cut flowers for supplying moisture to the flowers.

Baskets of the general character described are made in many forms and sizes, having varying depth, and top openings varying from a few inches to two feet or more. The baskets may be circular, rectangular or oval in cross section, and usually have downwardly converging sides.

Liners are usually formed of metal to hold water, and conform substantially to the shape of the baskets to fit therein snugly. The liners may be shallower than the baskets so that the upper edges of the former lie below the upper edges of the latter. The rims of the baskets may be rolled outwardly, or flare outwardly and upwardly, angularly to the vertically slanting lines of the tapering bodies of the baskets.

In order to simplify the description of the invention, one type of basket is shown comprising a tapering body having a distinct rim, and one type of liner is shown comprising a metal vase having tapering walls, the sides of the vase engaging the basket, and the rim of the vase being adjacent the rim of the basket.

My improved flower holder includes a reticulated or foraminate screen member 4 and flexible resilient legs comprising a plurality of branches including branches 5 connected with the screen to form a frame and branches 6 adapted to engage a vase or basket for supporting the screen therein to receive flower stems 7.

I preferably employ a pair of parallel vertically spaced screens including the screen 4 and a second screen 8. The screens may be constructed in any approved manner to provide perforations through which the flower stems may be passed, and I prefer to form the same of mesh wire cut to the desired contour.

The use of wire mesh screen and flexible wires, later referred to, permits wide variation in the forms of flower supports for various kinds of containers and flower arrangements. To simplify my disclosure I illustrate several forms of supports, each having one or more special features, it being understood that one or more of the special elements of any form illustrated, might be incorporated in a support having other features with which said element is not inconsistent.

In Fig. 1 the screens are illustrated as having circular contour to provide mesh discs conforming to the circular opening in the basket and liner illustrated. The top screen is preferably large enough to substantially cover the liner opening, and the edge of the lower screen may be spaced inwardly from the edge of the upper screen to conform to the slope of the liner.

Relatively heavy marginal annuli 9, for example heavy wires, are engaged with the peripheries of the mesh discs to bind the edges thereof and form substantial and relatively rigid rims or borders having appreciable width for promoting the firm attachment of the leg members to the screens.

Means for spacing the screens and supporting one from the other may include portions 10 of the branches 5 suitably secured to the screens, preferably by bending the portions over screen strands and fastening the same to the strands by suitable means, for example by solder.

Portions of the branches may be bent into parallelism with the screens and attached to the mesh disk strands as indicated at 11. The branches 5 normally extend substantially vertically but inbent slightly to promote flexing while the branches 6 are adapted to be bent outwardly to suitable positions for engaging the supporting wall of a vase or basket as the case may be.

The outer branches 6 are corrugated or waved to form a plurality of wrinkled or curved portions having elbows or exterior angles 12 adapted to engage the side wall of the liner and hooklike shoulders 13 adapted to engage the top edge of the liner and the edges of basket strands, as clearly illustrated in Fig. 1.

Hooks 14 are formed on the outer ends of the legs, to form protruding laterally extending fingers or prongs for engaging a supporting wall. The hooks are normally engaged over the upper edges of supporting elements to retain the holders against the depressing influence of the weight of the holders and material supported thereby, and may have a form specially adapting them for a particular situation, for example comprising penetration points for insertion in the interstices between strands of a basket rim.

The legs are formed of suitable flexible and elastic material, for example wire, to facilitate spreading of the legs to enable the branches 6 to engage supporting walls, and cause the branches to engage the walls with sufficient pressure to latch the frame in position.

Any number of leg branches may be provided to facilitate spreading of the legs to span the diameter of a liner, and locate a holder in desired relation with the liner opening, and the branches may extend in any desired direction from the holder and toward the liner and basket. In the forms shown, the inner branches extend downwardly from the holder, and the outer branches extend upwardly to locate the hooks adjacent the upper edges of the containers for more securely supporting the holder.

In the conventional use of perforate flower holders, the flower stems extend through a screen to water contained by the vase. When short stemmed flowers are included in an arrangement, the water level must be sufficiently high to effect immersion of the lower ends of short stems.

In order to minimize the amount of water required in a container for moistening flowers, and obviate the necessity for filling a liner to a level above the lower ends of short stemmed flowers suspended in the liner, and to support short stemmed flowers, I provide a can or tin 15 comprising a cup to contain water, and locate the cup in receiving relation with the stems of flowers arranged in the holder. The cup is illustrated as having a cylindrical body conforming to the shape of the screen element.

The cup may be mounted in a flower container in any desired relation with the screen element to obviate the necessity of providing a body of water in the container for moistening flowers having short stems extending through one or more screens, but preferably is supported by the holder close to the screens, so that the shortest stems may extend into the water.

The cup is preferably removably connected with the holder, and supported by the inner leg branches 5 of the holder frame, for example by vertical wires 16 having portions attached to the side wall of the cup and provided with hooks 17 engageable with wires of the holder, for example the wires of the lower screen.

The length of the suspending wires 16 is adjusted to locate the suspended cup in desired relation with the screens.

The liner is provided with apertures 18 adjacent its upper edge to receive prongs for further stabilizing the holder frame in supported position.

The leg branches are adapted to be spread to effect engagement of the outer branches with the container, the spreading being accomplished by bending the branches intermediately of their ends and by bending one branch away from the branch to which it is connected.

Figure 2:
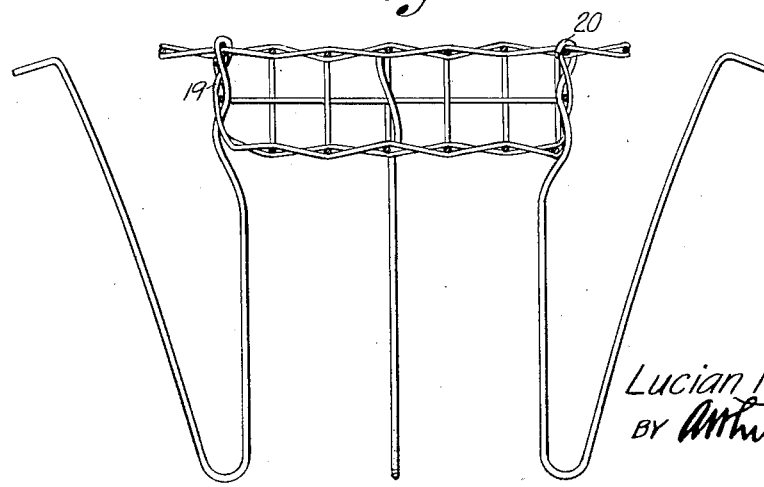
Fig. 2 is a central vertical section of a holder illustrating a modified form in which screens are spaced by portions of one of the screen members.

In Fig. 2 the screen-spacing element is illustrated as edge portions 19 of one of the screens, for example the lower screen having cutout corners producing wings which are upbent and attached to a relatively large upper screen at points spaced inwardly from the periphery thereof. The edges of the upper screen therefore project beyond the lower screen. The spacing wings thus form perforate side walls of the holder. Stems may be inserted through the peripheral or rim-like portion of the upper screen and through the perforate spacing members for supporting the stems in sharply inclined position and stems may be passed outside of the upper screen through the side wall and through the lower screen.

The two screens formed as illustrated in Fig. 2, are secured together by bent tips 20 of the inner branches of the legs, the end portions of said branches engaging the spacing wings, for example being threaded in the mesh thereof and being engaged with the lower screen at the edge thereof, whereby the leg branches are retained in substantially fixed relation with the screen.

In Fig. 3 a modified form of support is shown including a circumferential side wall or body 21 having an inturned upper edge forming a retaining flange or rim 22 adapted to engage one of the screens, and a lower flange 23 engaging the other screen. In this instance the screens are mounted and contained within a rigid annulus or wall and the spreader for spacing the screens comprises a strip 24 bent to form a ring having less diameter than the wall 21.

The inner branches of the legs which support the holder are fixedly attached to the wall 21 thereof, and extend downwardly from the unit comprising the cup and screens, while the outer branches diverge upwardly for extending the outbent prongs thereof into engagement with the wall of a container. The holder thus comprises a cup-like structure having a perforate bottom comprising the lower screen.

In order to avoid undue strain on the joints between the inner branches and a holder, and to retain the inner branches in substantially vertical position, an anchoring or retaining ring 25 may be mounted on the branches 5 in an intermediate position, as illustrated in Fig. 4, extending in eyes or loops 26 formed by bending the branches. The loops thus comprise hinge-like elements latched by the ring against lateral displacement, and the lower ends of the branches 5 may be bent outwardly without any strain being transmitted to the joints between the legs and the holder.

Fig. 4 further illustrates a modified form of flower support in which the leg branches 5 include inner end portions 27 overlying the top screen and attached to the mesh disk strands, and the spreader members are separate from the legs. Said branches have laterally extending portions bent in a plurality of directions downwardly and upwardly exteriorly to the screen to form latching shoulders or sockets 28 to receive the cup hooks.

In the modified form of support shown in Fig. 5, a spacer 29 similar to the annular spreader shown in Fig. 3 has reduced width to support a lower screen 30 above the imperforate bottom 31 of a cup, and the depth of the screen element is adapted to the height of the cup wall so that the inwardly projecting flange 32 on the upper edge of the cup may engage the upper screen and clamp the screen element in the cup.

The screen-spacing element comprises a perforate cylindrical body 33, for example wire mesh, to provide apertures for admitting stems inserted to the cup through the holes in the side thereof.

The holder unit including the cup and the screens is supported as in the other forms by the inner ends of the inner branches of the legs; in this instance however, the lateral ends of the inner branches being extended to form a shelf-like horizontal bracket on which the unit is mounted.

The legs are formed in pairs comprising a single wire bent to form inner branches 34 and 35 and intermediate bracket-like holder-supporting portions 36 fixed to the under surface of the cup bottom.

The term "flower container" has been used herein indiscriminately for a vase, liner, cup, can or basket, since a holder frame having laterally extending legs may be mounted in any vessel or receptacle for retaining a part of an arrangement in desired relation with other parts otherwise disposed in the container.

In applying the invention, a screen element may be formed of wire mesh held in spaced relation by selected means, and provided with supporting legs. The cup element may be engaged with the screens to form a unit adapted to contain water and support and supply moisture to the short stemmed flowers in an arrangement.

The side wall of the unit is made perforate so that stems may extend at a substantial inclination from vertical outside of the top screen through the side wall to the bottom of the holder.

The several elements shown in the various figures may be combined to provide a flower support adapted for a particular purpose.

When the cup is suspended below the screens, as in Figs. 1 and 4, short stems may extend through both screens into the cup, through one screen into the cup, or merely through the holes of the cup. In the last named instance the stems will rest on the edge of the container.

Long stems may extend through one or both screens toward the bottom of the container, or may be passed between the edge of the container and the holder to the bottom.

What I claim and desire to secure by Letters Patent is:

1. In a flower holder, in combination with a basket having interstices and a liner mounted in the basket, a screen, and means for supporting the screen in the liner including legs having bent ends adapted to engage in the interstices of the basket.

2. In a flower holder, a flower container having an aperture adjacent its upper edge, a screen, and means for supporting the screen in the container including a plurality of legs, one having a bent end adapted to engage in said aperture.

3. In a flower holder, in combination with a flower container having an aperture adjacent its upper edge, a screen, and means for supporting the screen in the container including a plurality of legs, one having a bent end adapted to engage in said aperture.

4. A flower holder including a screen for suspension in a liner mounted in a basket, and a screen support including resilient legs having portions adapted to engage the liner and end portions adapted to engage the basket.

5. In combination with a basket and a liner mounted in the basket, a flower holder including a screen, and a screen support including resilient legs, selected legs having portions adapted to engage the liner and other legs having portions adapted to engage the basket.

6. In combination with a flower holder including a screen and means for supporting the screen including resilient legs adapted to engage the walls of a flower container, a cup connected with the holder for receiving the lower ends of flower stems.

7. In a flower holder including a spaced screens, and means for supporting the screens including resilient legs adapted to engage the walls of a flower container, a cup for receiving the lower ends of the flower stems, and means including said legs for supporting the cup.

8. A flower holder including vertically spaced parallel screens, a cup containing the lower one of said screens and supporting means including legs having downbent inner end portions engaged with the cup and upbent outer end portions provided with hooks.

9. In combination with a flower holder including a screen, a water-containing cup having a bottom below the screen for receiving the ends of flower stems extending through the screen, a plurality of legs having resilient branches fixed to the screen and engageable with the wall of a container for supporting the screen, and means engaging the legs with the cup for supporting the same.

10. A flower holder comprising spaced screens, and legs having inner ends fixed to the screens and branches bent to extend adjacent to and spaced laterally from said inner ends to form a plurality of portions for engaging the wall of a container.

11. A flower holder including a cup and a screen member comprising vertically spaced screens, and flexible legs having upbent inner end branches connected with the holder and branches engageable with a wall of a flower container for supporting the holder in the container.

12. In a device of the character described, a screen, and supporting means including opposing, laterally adjustable legs having inner branches fixed to the screen and upbent outer branches of substantial length frictionally engageable with the inner surface of a receptacle wall.

13. A flower holder including a screen, supporting means including a leg bent to provide an upwardly outwardly extending branch engageable with a container and an inner branch, and means for connecting the inner branch with the screen.

14. A flower holder including a screen, supporting means including a leg bent to provide an inner branch and an upwardly extending branch having a hook on the end thereof to engage a container, and means for connecting the inner branch to the screen.

15. A flower holder including a screen, supporting means including a leg bent to form an inner branch extending downwardly from the screen, and an outer branch including an end bent to engage the edge portion of a container, and means for connecting the leg with the screen.

16. A flower holder including a screen, supporting means including a flexible member bent to provide an upwardly extending elongated outer branch conformable to the contour of a container wall to engage the inner surface of said wall over a substantial area, and an inner branch provided with means to engage the screen.

17. In a flower holder including a foraminous member, supporting means including adjustable legs in opposing relation extending upwardly outwardly from said member and having sufficient length to engage the inner surface of the side wall of a receptacle over a substantial extent of said wall and having hooks to engage over the rim of the receptacle.

18. In a device of the character described including a foraminous member, a support including a leg bent to provide inner and outer vertically extending branches, and means on one of said branches to engage a container.

19. In a flower holder including a screen, a support including legs having screen-supporting inner branches and outer branches flexibly connected to the inner branches and including terminal portions bent to form retainers engageable with the rim portion of a container.

20. A flower holder including a screen, supporting means including legs comprising wires bent to form upwardly diverging branches including inner branches having upper ends connected with the screen, and means engaged with intermediate portions of said inner branches for retaining said portions in substantially vertical position.

21. In a flower holder, a screen, and a support including legs having container-engaging branches and horizontally bent portions forming seats to receive the screen.

22. In a flower holder, a support including legs having upwardly diverging outer and inner branches having respectively container-engaging hooks and horizontally bent portions, and a screen element mounted on said portions.

23. In a flower holder, a screen element including spaced screens, and means holding the screens in spaced relation, and a support including a wire having an upwardly outwardly extending branch and an inner branch including a horizontally bent portion of the wire forming a seat for the screen element.

24. In combination with a container having an aperture adjacent its upper edge, a retaining member having an aperture for admitting the stem of a flower or the like to said member, and a support including a leg having branches of substantial length extending in laterally spaced relation with each other and including a branch fixed to the retaining member and a flexible branch having a bent end engageable in said aperture of the container.

25. A flower holder including spaced screens and a circumferential side wall, and legs engaged with said wall and engageable with the inner surface of the side wall of a container for supporting the holder in spaced relation with said side wall of the container.

26. A flower holder including upper and lower spaced screens, and screen supporting means including a leg having a resilient upwardly extending outer vertical branch and an inner branch having an upper end engaged with the upper screen and an intermediate bent portion engaged with the lower screen.

27. A flower holder including a shell provided with a series of openings sufficiently large to admit flower stems to the shell, and a screen member comprising vertically spaced screens, and flexible legs connected with the holder and engageable with a wall of a flower container for supporting the holder in the container.

28. A flower holder including a cup having an opening in its side wall to admit a flower stem to the cup, and a screen located in the cup, and means including a flexible leg connected with the holder and having a portion engageable with a wall of a flower container for supporting the holder in the container.

29. A holder for supporting articles in an open topped receptacle including an apertured body member, leg members having gripping portions extending upwardly between the wall of the receptacle and the body member when the holder is inserted in the receptacle and having loop shaped spring portions extending entirely below the body member so that the loop portions are free to flex inwardly below the body member to provide tension for retaining the gripping portions in engagement with the wall of the receptacle, and means attaching the leg members to the body member.

30. A holder for supporting articles in an open topped receptacle including an apertured body member, leg members having gripping portions extending upwardly between the wall of the receptacle and the body member when the holder is inserted in the receptacle and having loop shaped spring portions extending entirely below the body member so that the loop portions are free to flex inwardly below the body member to provide tension for retaining the gripping portions in engagement with the wall of the receptacle, hooks on the gripping portions for engaging the rim of the receptacle to positively retain the body member against downward movement in the receptacle, and means attaching the leg members to the body member.

LUCIAN ROSENWALD.